United States Patent
Yamashita (10) Patent No.: US 8,463,524 B2
(45) Date of Patent: Jun. 11, 2013

(54) AIR QUANTITY CONTROL DEVICE OF INTERNAL COMBUSTION ENGINE

(75) Inventor: Hiroshi Yamashita, Anjo (JP)

(73) Assignee: Denso Corporation, Kariya (JP)

( * ) Notice: Subject to any disclaimer, the term of this patent is extended or adjusted under 35 U.S.C. 154(b) by 974 days.

(21) Appl. No.: 12/538,985

(22) Filed: Aug. 11, 2009

(65) Prior Publication Data

US 2010/0057331 A1 Mar. 4, 2010

(30) Foreign Application Priority Data

Aug. 29, 2008 (JP) ................................. 2008-221744

(51) Int. Cl.
*G06F 17/00* (2006.01)
*G06F 7/00* (2006.01)
*B60T 7/12* (2006.01)

(52) U.S. Cl.
USPC ............ 701/102; 701/103; 123/445; 123/575

(58) Field of Classification Search
USPC .................. 701/103, 102, 114; 123/445, 575, 123/30, 361, 399, 403
See application file for complete search history.

(56) References Cited

U.S. PATENT DOCUMENTS

| 4,940,030 | A   | * | 7/1990 | Morikawa  | 123/198 D |
| 7,673,613 | B2  | * | 3/2010 | Yamashita | 123/399   |
| 2010/0031941 | A1 | * | 2/2010 | Hokuto    | 123/575   |
| 2012/0031374 | A1 | * | 2/2012 | Hokuto    | 123/445   |

FOREIGN PATENT DOCUMENTS

| JP | 1-113528   | 5/1989 |
| JP | 2006-257939 | 9/2006 |

\* cited by examiner

*Primary Examiner* — Mahmoud Gimie
*Assistant Examiner* — David Hamaoui
(74) *Attorney, Agent, or Firm* — Nixon & Vanderhye PC (57) ABSTRACT

An ECU calculates actual intake air quantity suctioned into a combustion chamber or a value correlated with the actual intake air quantity as an actual measurement data based on a measurement value of an airflow meter. The ECU calculates intake air quantity estimated to be suctioned into the combustion chamber or a value correlated with the estimated intake air quantity as an estimation data based on a drive state of a throttle actuator. The ECU detects an abnormality in the throttle actuator based on a deviation degree between the actual measurement data and the estimation data. In the abnormality detection, the ECU changes at least one of an abnormality determination value used in the abnormality determination using the deviation degree, the actual measurement data and the estimation data based on a fuel property sensed with a fuel property sensor.

3 Claims, 4 Drawing Sheets

AIR QUANTITY CONTROL DEVICE OF INTERNAL COMBUSTION ENGINE

CROSS REFERENCE TO RELATED APPLICATION

This application is based on and incorporates herein by reference Japanese Patent Application No. 2008-221744 filed on Aug. 29, 2008.

BACKGROUND OF THE INVENTION

1. Field of the Invention

The present invention relates to an air quantity control device of an internal combustion engine and in particular to an air quantity control device of an internal combustion engine that detects an abnormality in a throttle actuator or the like.

2. Description of Related Art

Conventionally, there has been proposed a technology comparing intake air quantity, which is calculated based on a throttle opening, and intake air quantity, which is measured with an airflow meter or the like, thereby detecting an abnormality in the airflow meter or a throttle actuator constituted by a throttle valve, a throttle position sensor and the like (for example, refer to Patent document 1: JP-A-2006-257939). The technology described in Patent document 1 estimates the intake air quantity at least from atmospheric pressure, engine rotation speed and the throttle opening and determines that the airflow meter is abnormal when a deviation between the estimated air quantity and the actual air quantity measured with the airflow meter is equal to or larger than an abnormality determination value and an air-fuel ratio is outside a predetermined range. It is thought that not only the abnormality in the airflow meter but also the abnormality in the throttle actuator can be detected with the technology of Patent document 1.

In recent years, against a backdrop of the concern about the depletion of the petroleum resources, the necessity for the alleviation of the global warming and the like, the alcohol fuel has been drawing more and more attentions as a substitute for the fossil fuels such as the gasoline. The alcohol fuel is used singularly or is mixed with the other fuel such as the gasoline and used as the fuel for the internal combustion engine. Against such the backdrop, various kinds of methods for performing the combustion control of the internal combustion engine using the fuel including the alcohol have been proposed (for example, refer to Patent document 2: JP-A-H1-113528).

The fuel property differs between the gasoline and the alcohol. For example, the octane number of the alcohol is higher than that of the gasoline. The ignition timing can be set on a more advanced side as the octane number of the fuel increases. Therefore, in the case where a mixture gas containing intake air quantity defined at a predetermined throttle opening is combusted at a target air-fuel ratio, it is thought that the output torque of the internal combustion engine generated by the combustion is larger in the case of the alcohol than in the case of the gasoline because of the difference in the ignition timing. Therefore, in the case where the abnormality in the throttle actuator or the like is detected based on the result of the comparison between the intake air quantity estimated from the throttle opening and the like and the intake air quantity measured with the airflow meter and the like, the output torque at the time when the abnormality is determined to be present differs in accordance with the fuel property. As a result, in the case of using the fuel containing the alcohol, there is a possibility that the occurrence of the abnormality is not detected although there is actually an occurrence state of the excess torque or there is a possibility that the occurrence of the abnormality is detected although there is actually no occurrence state of the excess torque.

SUMMARY OF THE INVENTION

It is an object of the present invention to provide an air quantity control device of an internal combustion engine capable of accurately performing abnormality detection of an air quantity adjusting device such as a throttle actuator irrespective of kinds of fuel components.

According to an aspect of the present invention, an air quantity control device of an internal combustion engine performs air quantity control by controlling and driving an air quantity adjusting device, which is provided in an intake system of the internal combustion engine and which adjusts intake air quantity suctioned into a combustion chamber by opening and closing an intake passage.

The air quantity control device has an actual measurement data calculating device, an estimation data calculating device, an abnormality detecting device, a fuel property sensing device and a changing device.

The actual measurement data calculating device calculates actual intake air quantity suctioned into the combustion chamber or a value correlated with the actual intake air quantity as an actual measurement data based on a measurement value of an air quantity measuring device provided to the intake passage.

The estimation data calculating device calculates intake air quantity estimated to be suctioned into the combustion chamber or a value correlated with the estimated intake air quantity as an estimation data based on a drive state of the air quantity adjusting device.

The abnormality detecting device detects an abnormality in the air quantity adjusting device based on a deviation degree between the actual measurement data calculated by the actual measurement data calculating device and the estimation data calculated by the estimation data calculating device.

The fuel property sensing device senses a property of fuel supplied to the internal combustion engine.

The changing device changes at least one of an abnormality determination value used by the abnormality detecting device in the abnormality determination using the deviation degree, the actual measurement data and the estimation data based on the fuel property sensed with the fuel property sensing device.

Existence/nonexistence of the abnormality in the air quantity adjusting device is detected based on the variation in the estimation air quantity (the estimation data) with respect to the actual air quantity (the actual measurement data). Thus, the abnormality such as the occurrence of the excess torque due to the variation can be detected. It is thought that the relationship between the air quantity and the output torque differs between the cases using fuels having different properties. Therefore, there is a possibility that the occurrence of the abnormality is detected although there is actually no abnormal state (i.e., there is no occurrence state of excess torque) in the above-described abnormality determination. Conversely, there is also a possibility that the occurrence of the abnormality is not detected although there is actually an abnormal state (i.e., there is an occurrence state of the excess torque).

In this regard, according to the above aspect, in the abnormality determination using the deviation degree between the actual measurement data and the estimation data, at least one of the abnormality determination value used in the abnormality determination, the actual measurement data and the estimation data is changed in accordance with the fuel property of each time. Therefore, the abnormality detection can be performed in accordance with the property of the fuel supplied to the internal combustion engine. As a result, the abnormality detection of the air quantity adjusting device can be performed with high accuracy.

The actual measurement data includes the torque or the throttle opening calculated based on the measurement value of the air quantity measuring device. The estimation data includes the torque or the throttle opening calculated based on the drive state of the air quantity adjusting device.

If the gasoline or the alcohol is used singularly as the fuel or the mixed fuel of the gasoline and the alcohol is used, the relationship between the air quantity and the torque varies because the fuel property differs between the gasoline and the alcohol. For example, the octane number differs between the gasoline and the alcohol. Therefore, when the alcohol is used as the fuel, the ignition timing can be set on a more advanced side than in the case where the gasoline is used as the fuel. Therefore, it is thought that the torque generated in the internal combustion engine when the combustion is caused with the same intake air quantity at the theoretical air-fuel ratio is larger in the case of the alcohol than in the case of the gasoline.

In consideration of this point, according to another aspect of the present invention, the fuel property sensing device senses a ratio of alcohol in the fuel as the fuel property. The changing device changes at least one of the abnormality determination value, the actual measurement data and the estimation data in accordance with the sensed ratio of the alcohol.

With this construction, at least one of the abnormality determination value, the actual measurement data and the estimation data is changed in accordance with the ratio between the gasoline and the alcohol. Therefore, when at least one of the gasoline and the alcohol is used as the fuel, the abnormality detection of the air quantity adjusting device can be performed with high accuracy irrespective of the alcohol concentration in the fuel.

According to another aspect of the present invention, the air quantity adjusting device has a throttle valve for opening and closing the intake passage and an opening degree sensor for sensing an opening degree of the throttle valve. The estimation data calculating device obtains a sensing value of the opening degree sensor as a parameter indicating the drive state of the air quantity adjusting device and calculates the estimation data based on the sensing value of the opening degree sensor. The abnormality detecting device detects an abnormality in the opening degree sensor based on the deviation degree between the actual measurement data and the estimation data.

With the construction, the abnormality in the throttle position sensor is detected based on the deviation degree between the actual measurement data and the estimation data. Therefore, the abnormality in the throttle position sensor can be detected with high accuracy.

According to yet another aspect of the present invention, the air quantity control device further has a device for detecting an abnormality in the fuel property sensing device. The changing device sets the abnormality determination value within a predetermined range defined beforehand. The changing device sets the abnormality determination value at the minimum value in the predetermined range when the abnormality in the fuel property sensing device is detected.

With the construction, the abnormality determination is performed by setting the abnormality determination value at the minimum value when the property of the fuel supplied to the internal combustion engine cannot be specified due to the abnormality in the fuel property sensing device. Therefore, the occurrence of the excess torque due to the abnormality in the air quantity adjusting device can be suitably avoided.

BRIEF DESCRIPTION OF THE DRAWINGS

Features and advantages of an embodiment will be appreciated, as well as methods of operation and the function of the related parts, from a study of the following detailed description, the appended claims, and the drawings, all of which form a part of this application. In the drawings:

DETAILED DESCRIPTION OF EXAMPLE EMBODIMENT

Figure 1:
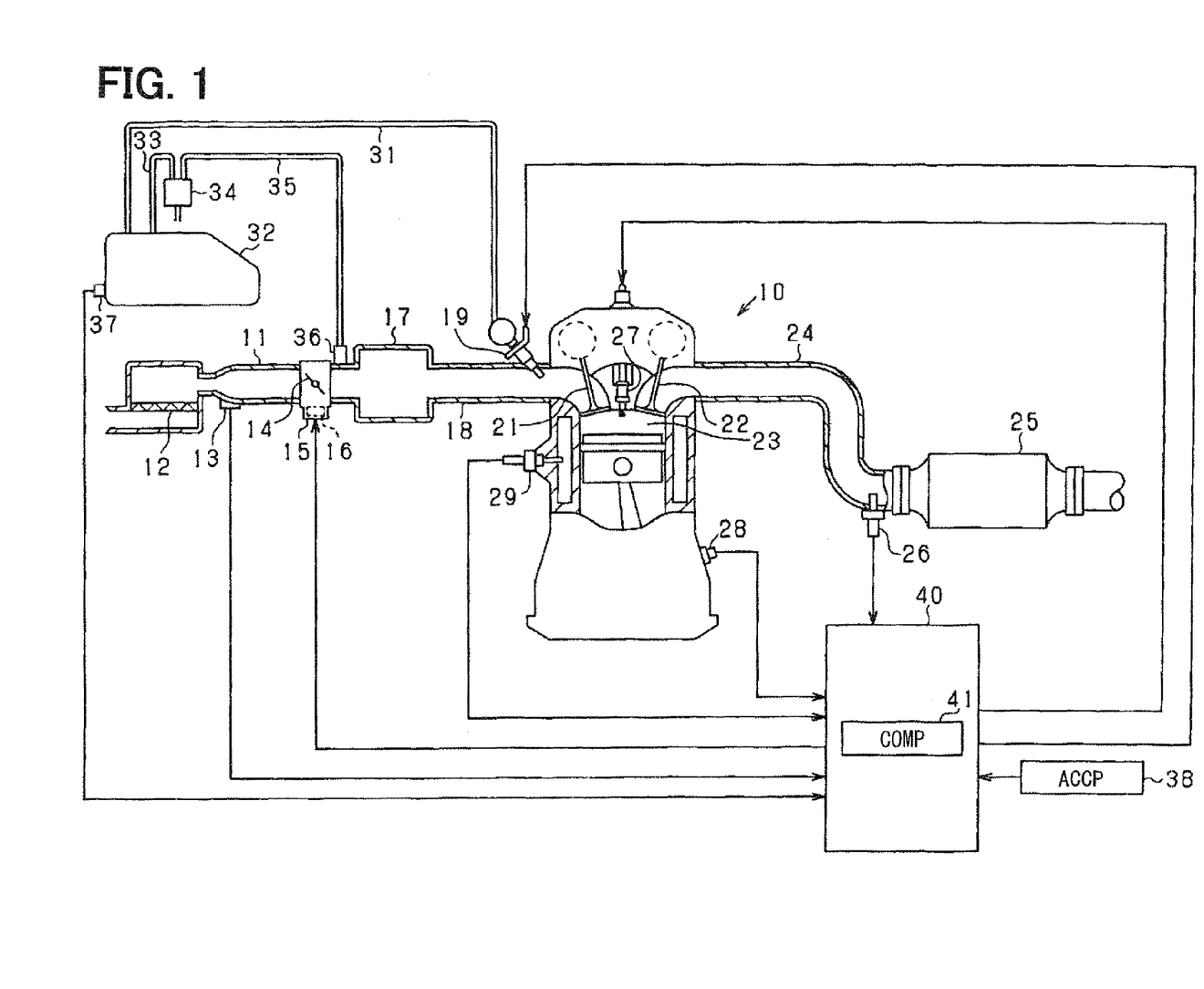
FIG. 1 is a construction diagram schematically showing an entirety of an engine control system according to an embodiment of the present invention.

Hereafter, an embodiment of the present invention will be described with reference to the drawings. The present embodiment is constructed as an engine control system for an in-vehicle multi-cylinder spark-ignition engine that is an internal combustion engine. The engine uses at least one of gasoline and alcohol such as ethanol or methanol as fuel. That is, the engine uses fuel consisting only of the gasoline or uses mixture fuel, in which the alcohol is mixed at an arbitrary ratio. In the control system, an electronic control unit (referred to as an ECU, hereafter) centrally performs control of fuel injection quantity, control of ignition timing and the like. FIG. 1 is a construction diagram schematically showing the entirety of the engine control system.

An air cleaner 12 is provided in a most upstream portion of an intake pipe 11 of the engine 10 shown in FIG. 1. An airflow meter 13 for sensing intake air quantity is provided downstream of the air cleaner 12. A throttle actuator 15 (an air quantity adjusting device) is provided downstream of the airflow meter 13. The throttle actuator 15 is constituted by a throttle valve 14 provided in an intake passage, a DC motor (not shown) for opening/closing the throttle valve 14, and a throttle position sensor 16 for sensing an opening degree of the throttle valve 14 (i.e., a throttle opening). The opening degree of the throttle valve 14 is adjusted by drive control of the DC motor.

A surge tank 17 is provided downstream of the throttle valve 14. An intake manifold 18 for introducing an air into each cylinder of the engine 10 is connected to the surge tank 17. An electromagnetic drive injector 19 for performing injection supply of fuel is attached to vicinity of an intake port of each cylinder in the intake manifold 18.

The injector 19 is connected to a fuel tank 32 through a fuel pipe 31. A canister 34 is connected to the fuel tank 32 through a conduit pipe 33. A fuel evaporative emission generated in the fuel tank 32 is adsorbed to the canister 34. A purge pipe 35 as an outgassing path is connected to the canister 34, and a purge valve 36 is provided to the purge pipe 35. The fuel evaporative emission adsorbed to the canister 34 is discharged to an intake system through the purge pipe 35 by adjustment of an opening degree of the purge valve 36.

A fuel property sensor 37 capable of sensing an alcohol concentration is provided to the fuel tank 32. An alcohol concentration in the fuel tank 32 (i.e., a ratio between the gasoline and the ethanol in the fuel in the fuel tank 32) is sensed from a sensing value of the fuel property sensor 37.

An intake valve 21 and an exhaust valve 22 are provided to an intake port and an exhaust port of the engine 10 respectively. A mixture gas of the air and the fuel is introduced into a combustion chamber 23 by a valve-opening operation of the intake valve 21. Exhaust gas after the combustion is discharged to an exhaust pipe 24 by a valve-opening operation of the exhaust valve 22.

A spark plug 27 is attached to a cylinder head of the engine 10 for each cylinder. High voltage is applied to the spark plug 27 at desired ignition timing through an ignition device (not shown) consisting of an ignition coil and the like. Due to the applied high voltage, a spark discharge occurs between opposed electrodes of the spark plug 27. Thus, the mixture gas introduced into the combustion chamber 23 is ignited and used for the combustion.

A catalysts 25 such as a three-way catalyst is provided in the exhaust pipe 24 for purifying CO, HC, NOx and the like in the exhaust gas. An oxygen sensor 26 is provided upstream of the catalyst 25. The oxygen sensor 26 senses an air-fuel ratio (or an oxygen concentration) of the mixture gas (the exhaust gas in the present embodiment). In the present embodiment, for example, the oxygen sensor 26 is a cup-shaped A/F sensor that outputs a wide-area air-fuel ratio signal proportional to the oxygen concentration in the exhaust gas.

A coolant temperature sensor 29 and a crank angle sensor 28 are fixed to the engine 10. The coolant temperature sensor 29 senses coolant temperature. The crank angle sensor 28 outputs a crank angle signal in a rectangular shape at every predetermined crank angle of the engine 10. Furthermore, the system is provided with an accelerator sensor 38 for sensing a pressed amount of an accelerator (i.e., an accelerator position ACCP) and the like.

The ECU 40 is constituted mainly by a microcomputer 41 consisting of CPU, ROM, RAM and the like as already known. The ECU 40 executes various kinds of control programs stored in the ROM to perform various types of control of the engine 10 in accordance with an engine operation state of each time. That is, the microcomputer 41 of the ECU 40 receives inputs of the sensing signals respectively from the various sensors described above. The microcomputer 41 calculates a target throttle opening, fuel injection quantity, ignition timing and the like based on the various sensing signals and controls drive of the throttle actuator 15, the injector 19 and the ignition device.

The microcomputer 41 performs intake air quantity control using the throttle actuator 15 as follows. That is, the microcomputer 41 sets the target throttle opening based on the accelerator position ACCP, engine rotation speed and the like. The microcomputer 41 controls the drive of the throttle actuator 15 to conform the sensing value of the throttle position sensor 16 to the target throttle opening. According to the present embodiment, when the target throttle opening is set, request torque corresponding to the present accelerator position ACCP is calculated based on a map or the like, for example. Then, target air quantity is calculated based on the calculated request torque, the engine rotation speed and the alcohol concentration according to a map or the like, for example. Then, the target throttle opening for realizing the calculated target air quantity is calculated based on a map or a mathematical model, for example. Then, a control command value based on deviation of the actual throttle opening from the target throttle opening is outputted to the throttle actuator 15.

The microcomputer 41 performs the ignition control as follows. That is, the microcomputer 41 sets the ignition timing by advancing the ignition timing to the earliest timing within a range where knocking does not occur. The microcomputer 41 controls the ignition device to perform the ignition at the ignition timing. In the present embodiment, the ignition timing is set at various timings in accordance with the alcohol concentration in the fuel. The octane number varies among the fuels, and the alcohol has the higher octane number than the gasoline. Accordingly, the alcohol is less apt to cause the knocking than the gasoline. Therefore, the ignition timing is set on a more advanced side as the alcohol concentration in the fuel increases.

If a failure of the throttle position sensor 16 or the like occurs (e.g., if the deviation between the sensing value and the true value of the throttle opening is large) as an abnormality in the intake air quantity control, the control of the intake air quantity cannot be performed properly. As a result, there is a possibility that torque that is excessive as compared to the request torque is generated in the engine 10. In order to detect such the abnormality in the throttle position sensor 16 or the like, in the present embodiment, actual measurement air quantity QAF (actual measurement data) is compared with estimation air quantity QTH (estimation data). The actual measurement air quantity QAF is the actual intake air quantity suctioned into the combustion chamber 23 and is calculated based on the measurement value of the airflow meter 13. The estimation air quantity QTH is air quantity estimated to be suctioned into the combustion chamber 23 and is calculated based on the throttle opening measurement value of the throttle position sensor 16. It is determined that there exists an abnormality in the intake air quantity control such as an abnormality in the throttle position sensor 16 when a deviation degree Rd (=QAF−QTH) of the estimation air quantity QTH from the actual measurement air quantity QAF is equal to or greater than an abnormality determination value Rdth.

The engine 10 according to the present embodiment uses the alcohol or the gasoline singularly as the fuel or uses the mixture of the alcohol and the gasoline as the fuel. The engine 10 sets the ignition timing on the more advanced side as the alcohol concentration in the fuel increases. Therefore, when the mixture gas containing the air quantity suctioned at a predetermined throttle opening is combusted at a target air-fuel ratio (for example, the theoretical air-fuel ratio), the output torque generated by the combustion increases as the alcohol concentration increases.

Figure 2:
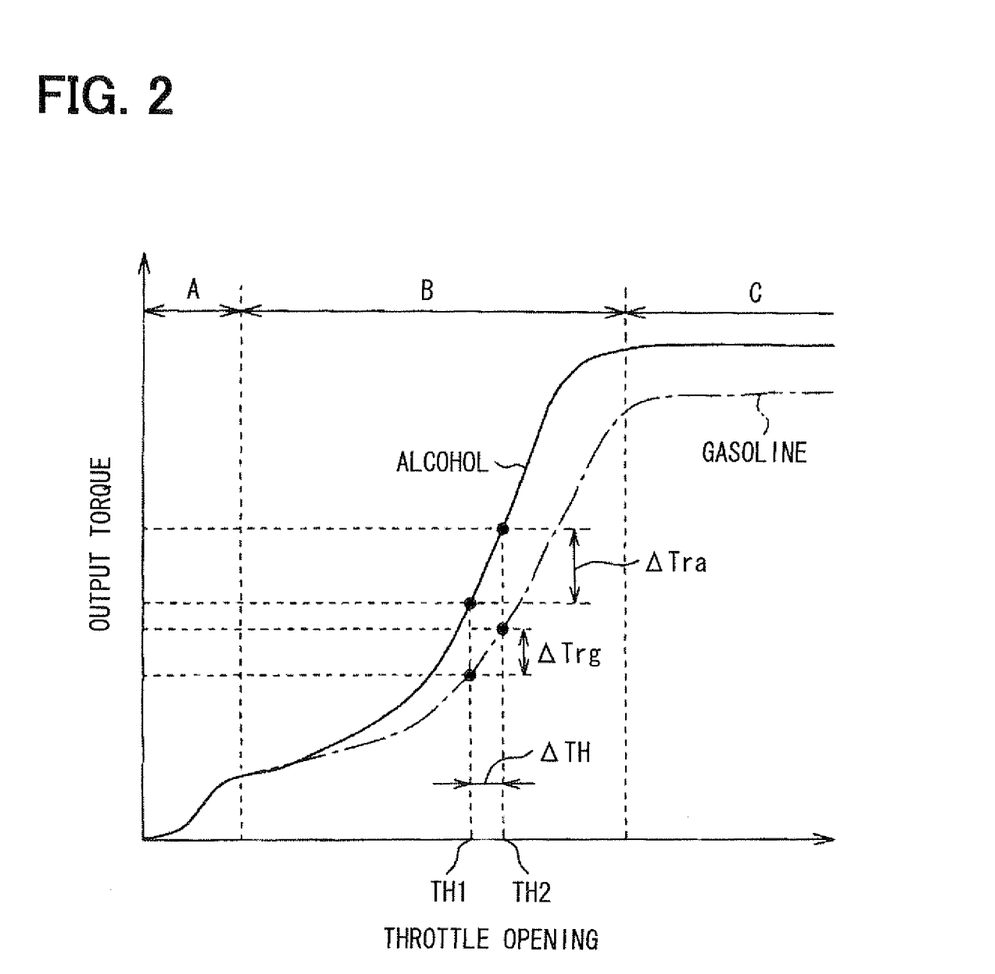
FIG. 2 is a diagram showing a relationship between a throttle opening and output torque according to the embodiment.

FIG. 2 is a diagram showing a relationship between the throttle opening and the output torque. In FIG. 2, a solid line shows a case where the alcohol is singularly used as the fuel, and a chained line shows a case where the gasoline is singularly used as the fuel. As shown in FIG. 2, the relationship between the throttle opening and the output torque is different between the gasoline and the alcohol. More specifically, the output torque corresponding to the throttle opening is the same between the gasoline and the alcohol in a small-opening range (range A in FIG. 2) in which the throttle opening ranges from a fully-closed state to a predetermined opening. In the range A, the output torque increases as the throttle opening increases. In a middle-opening range (range B in FIG. 2), the output torque increases as the throttle opening increases in both cases of the gasoline and the alcohol as in the small-opening range A. However, in the range B, a rate of change of the output torque with respect to the change of the throttle opening is larger in the case of the alcohol than in the case of the gasoline. In a large-opening range (range C in FIG. 2), the output torque is larger in the case of the alcohol than in the case of the gasoline. In the range C, the output torque is constant regardless of the throttle opening in both cases of the alcohol and the gasoline.

Next, a case where deviation arises between the actual measurement air quantity QAF, which is calculated from the measurement value of the airflow meter 13, and the estimation air quantity QTH, which is calculated from the measurement value of the throttle position sensor 16, due to the abnormality in the throttle position sensor 16 as an example will be considered. In FIG. 2, TH2 represents the actual throttle opening (i.e., the throttle opening corresponding to the intake air quantity sensed with the airflow meter 13), and TH1 is the measurement value of the throttle position sensor 16. When the gasoline is singularly used as the fuel, the measurement value TH1 of the throttle position sensor 16 deviates from the actual throttle opening TH2 by ΔTH (=TH2−TH1), thereby causing deviation ΔTrg in the output torque. When the alcohol is used singularly as the fuel, deviation ΔTra (>ΔTrg) arises in the output torque due to the deviation ΔTH of the throttle opening.

In this way, the output torque difference ΔTr corresponding to ΔTH (i.e., the deviation of the intake air quantity) differs between the alcohol and the gasoline. The output torque difference ΔTr corresponding to the same ΔTH is larger in the case of the alcohol than in the case of the gasoline. Therefore, there is a concern that the abnormality of the throttle actuator 15 cannot be detected accurately when the detection of the abnormality of the throttle actuator 15 is performed based on the deviation degree Rd between the actual measurement air quantity QAF and the estimation air quantity QTH. That is, if the abnormality determination value is set based on the gasoline, there is a possibility that the abnormality is not detected in spite of the existence of the occurrence state of the excess torque when the fuel contains the alcohol. If the abnormality determination value is set based on the alcohol, there is a possibility that the abnormality is erroneously detected in spite of the nonexistence of the occurrence state of the excess torque when the fuel contains the gasoline.

Therefore, in the present embodiment, the abnormality determination value Rdth is variably set in accordance with the property of the fuel in the fuel tank 32 when detecting the abnormality in the intake air quantity control by comparing the deviation degree Rd between the actual measurement air quantity QAF and the estimation air quantity QTH with the abnormality determination value Rdth. As this processing, the microcomputer 41 of the ECU 40 performs following processing.

Figure 3:
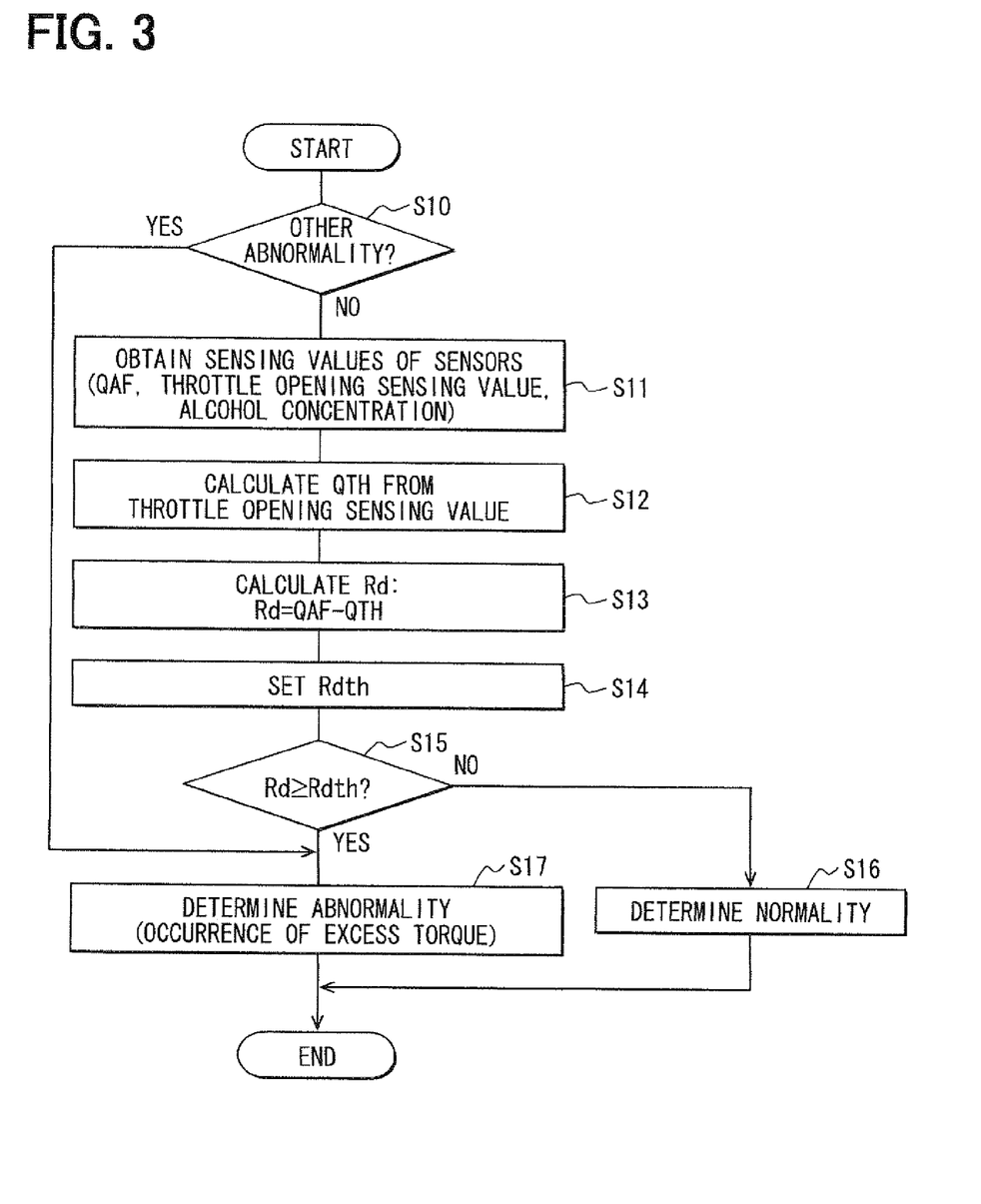
FIG. 3 is a flowchart showing a processing procedure of abnormality detection processing in intake air quantity control according to the embodiment.

FIG. 3 is a flowchart showing a processing procedure of abnormality detection processing in the intake air quantity control. The microcomputer 41 of the ECU 40 performs the processing in a predetermined cycle.

In FIG. 3, first in S10, it is determined whether an abnormality in the airflow meter 13 or the throttle actuator 15 is detected by an abnormality detection method other than the abnormality detection method that is based on the deviation degree Rd. In the present embodiment, the other abnormality detection method includes a method of detecting a state where disconnection or a short circuit of the airflow meter 13 occurs, a method of detecting a state where the deviation of the throttle opening sensed by the throttle position sensor 16 from a target value is equal to or greater than a predetermined value, and a method of detecting a state where a fully-energized state of the throttle actuator 15 is continued for a predetermined time or longer.

If the abnormality in the intake system is not detected by the other abnormality detection method (S10=NO), then the process proceeds to S11. In S11, the sensing values of the various sensors of the airflow meter 13, the throttle position sensor 16 and the fuel property sensor 37 (i.e., the actual measurement air quantity QAF, the throttle opening sensing value and the alcohol concentration) are obtained respectively. In following S12, the estimation air quantity QTH is calculated based on the throttle opening sensing value.

In the present embodiment, the estimation air quantity QTH is calculated using a mathematical model. More specifically, the mathematical model is constituted by a throttle model, an intake manifold model and an intake valve model. When the estimation air quantity QTH is calculated, first, throttle passing air quantity is calculated from the throttle opening and a previous value of pressure downstream of the throttle valve 14 (i.e., intake manifold pressure) with the use of the throttle model. The initial intake manifold pressure is the atmospheric pressure, for example. Then, the intake manifold pressure is calculated from the throttle passing air quantity and intake valve passing air quantity (previous value) with the use of the intake manifold model. Then, the intake valve passing air quantity is calculated from the intake manifold pressure and the engine rotation speed with the use of the intake valve model. The intake valve passing air quantity is used as the estimation air quantity QTH.

The calculation method of the estimation air quantity QTH is not limited to the above-described method. Alternatively, for example, a map or the like indicating a relationship between the throttle opening and the intake air quantity may be stored beforehand and may be used for calculating the estimation air quantity QTH.

Figure 4:
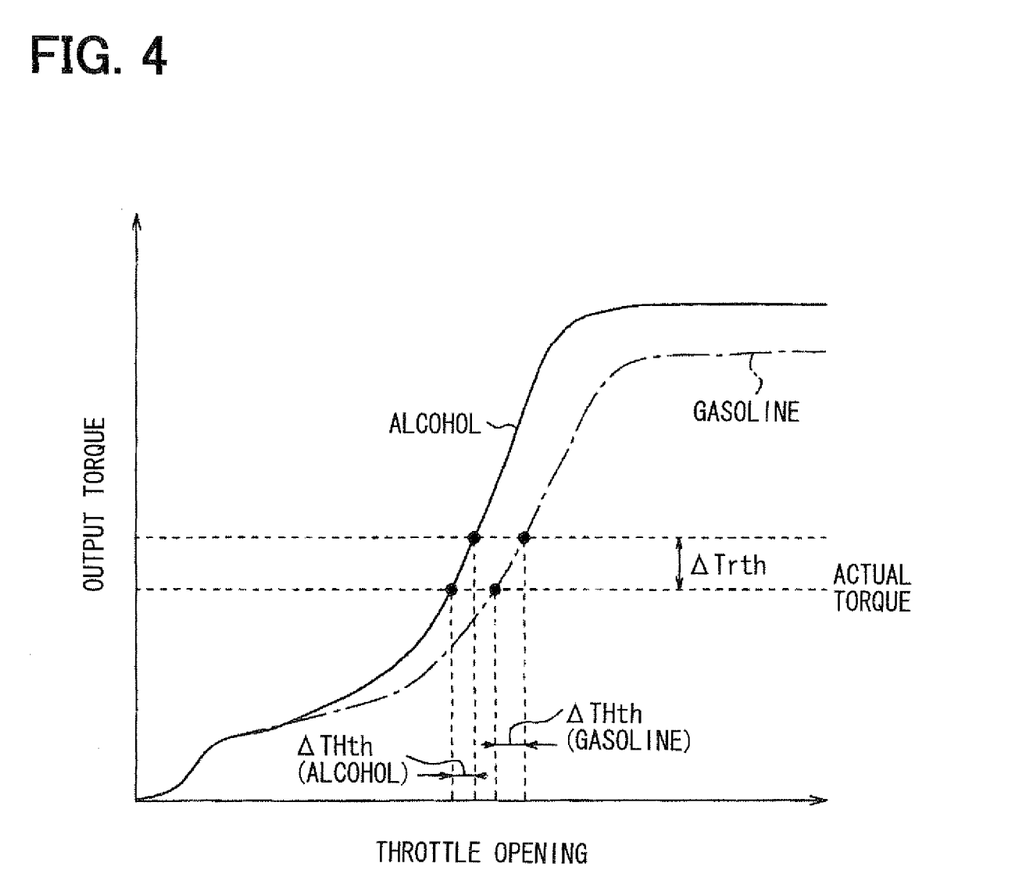
FIG. 4 is a diagram showing a relationship between the throttle opening and the output torque for explaining an abnormality determination value according to the embodiment.

In S13, the deviation degree Rd (=QAF−QTH) is calculated by subtracting the estimation air quantity QTH from the actual measurement air quantity QAF, and in S14, the abnormality determination value Rdth is calculated. In the present embodiment, the abnormality determination value Rdth is set at different values in accordance with the alcohol concentration. More specifically, for example as shown in FIG. 4, allowable torque difference ΔTrth with respect to the actual torque is set beforehand. Then, a throttle opening difference ΔTHth corresponding to the allowable torque difference ΔTrth is converted into the intake air quantity. The intake air quantity after the conversion is used as the abnormality determination value Rdth. The throttle opening difference ΔTHth is smaller in the case of the alcohol than in the case of the gasoline. Therefore, as shown in FIG. 4, the abnormality determination value Rdth is smaller in the case of the alcohol than in the case of the gasoline. The actual torque is calculated based on the actual measurement air quantity QAF, for example.

In S15 of FIG. 3, the deviation degree Rd is compared with the abnormality determination value Rdth. If the deviation degree Rd is smaller than the abnormality determination value Rdth, the process proceeds to S16. In S16, it is determined that there is no occurrence state of the excess torque due to the abnormality in the throttle actuator 15. If the deviation degree Rd is equal to or greater than the abnormality determination value Rdth, the process proceeds to S17. In S17, it is determined that there is a state where the excess torque occurs due to the abnormality in the throttle actuator 15, and the process shifts to a failsafe mode.

The above-described present embodiment exerts following excellent effects.

The abnormality in the throttle actuator 15 or the like is detected based on the deviation degree Rd between the actual measurement air quantity QAF, which is calculated based on the measurement value of the airflow meter 13, and the estimation air quantity QTH, which is calculated based on the measurement value of the throttle position sensor 16. The abnormality determination value Rdth is set based on the alcohol concentration. The above construction can avoid the erroneous detection of the occurrence of the abnormality when there is actually no occurrence state of the excess torque. The above construction can also avoid the failure of the detection of the occurrence of the abnormality when there is actually an occurrence state of the excess torque. As a result, the abnormality detection of the throttle actuator 15 or the like can be performed with high accuracy. Specifically, the above construction is suitable for detection of the abnormality in the throttle position sensor 16.

In the present embodiment, the abnormality determination value Rdth is set based on the allowable torque difference ΔTrth with respect to the actual torque. Therefore, the occurrence of the excess torque from the engine 10 can be suitably avoided.

In the present embodiment, the abnormality determination value Rdth is set at the different values between the gasoline and the alcohol. Therefore, when a mixture of the gasoline and the alcohol at an arbitrary ratio is used as the fuel, the abnormality detection of the throttle actuator 15 can be performed with high accuracy irrespective of the alcohol concentration in the fuel.

The present invention is not limited to the above-described embodiment but may be implemented as follows, for example.

In the above-described embodiment, the abnormality determination value Rdth used for the abnormality determination using the deviation degree Rd is variably set based on the alcohol concentration. Alternatively, instead of varying the abnormality determination value Rdth in accordance with the alcohol concentration, at least either one of the actual measurement air quantity QAF and the estimation air quantity QTH may be corrected based on the alcohol concentration. Also with the construction, the abnormality determination is performed in consideration of the torque difference due to the difference in the fuel property. Therefore, effects similar to those of the above-described embodiment can be exerted.

In the above-described embodiment, the actual measurement air quantity QAF calculated based on the measurement value of the airflow meter 13 is used as the actual measurement data, and the estimation air quantity QTH calculated based on the throttle opening sensing value of the throttle position sensor 16 is used as the estimation data. Alternatively, the torque or the throttle opening calculated based on the measurement value of the airflow meter 13 may be used as the actual measurement data, and the torque or the throttle opening calculated based on the drive state of the throttle actuator 15 may be used as the estimation data. The drive state of the throttle actuator 15 should be preferably calculated based on the throttle opening sensing value of the throttle position sensor 16.

In the above-described embodiment, the deviation degree Rd is calculated by subtracting the estimation air quantity QTH from the actual measurement air quantity QAF. The abnormality determination of the throttle actuator 15 or the like is performed by comparing the deviation degree Rd with the abnormality determination value Rdth. Alternatively, a ratio between the actual measurement air quantity QAF and the estimation air quantity QTH may be used as the deviation degree, and the abnormality determination of the throttle actuator 15 or the like may be performed by comparing the deviation degree with an abnormality determination value.

In the above-described embodiment, the throttle opening difference ΔTHth corresponding to the allowable torque difference ΔTrth is converted into the intake air quantity, and the converted value is used as the abnormality determination value Rdth. The setting method of the abnormality determination value Rdth is not limited to this. For example, an allowable deviation degree may be set beforehand, and the deviation degree may be corrected in accordance with the fuel property.

In the above-described embodiment, the throttle actuator 15 is determined to be abnormal when the deviation degree Rd is equal to or greater than the abnormality determination value Rdth. Alternatively, the lower limit of the allowable deviation degree Rd may be set as an abnormality determination value, and the throttle actuator 15 may be determined to be abnormal when the deviation degree Rd is equal to or smaller than the lower limit. With the construction, the abnormality in the case where the estimation air quantity QTH is larger than the actual measurement air quantity QAF can be detected. Therefore, an abnormality such as torque shortage can be detected.

In the above-described embodiment, the airflow meter 13 is used as the air quantity measuring device, and the intake air quantity is calculated based on the measurement value of the airflow meter 13. Alternatively, an intake pipe pressure sensor provided to the surge tank 17 for sensing intake pipe inner pressure may be used as an air quantity measuring device, and the intake air quantity may be calculated based on a measurement value of the intake pipe pressure sensor.

In the above-described embodiment, the abnormality determination value Rdth may be set within a predetermined range defined beforehand. The abnormality determination value Rdth may be set at the minimum value Rdth in the predetermined range when the abnormality of the fuel property sensor 37 is detected. With such the construction, when the fuel property cannot be specified, the abnormality determination is performed by setting the abnormality determination value Rdth at the minimum value in the set range. The construction is suitable for surely avoiding the occurrence of the excess torque due to the abnormality in the throttle actuator 15 or the like. For example, the alcohol concentration in the fuel may be estimated based on a sensing value of an exhaust gas sensor provided to the exhaust passage, and the abnormality in the fuel property sensor 37 may be detected based on deviation between the estimated alcohol concentration and the alcohol concentration sensed with the fuel property sensor 37.

In the above-described embodiment, the request torque is calculated based on the accelerator position and the like, and the target throttle opening is calculated from the target intake air quantity calculated based on the request torque. Alternatively, without calculating the request torque, for example, the target intake air quantity may be calculated from the accelerator position and the engine rotation speed, and the target throttle opening may be calculated from the target intake air quantity. Also in this case, effects similar to the above-described effects can be exerted.

Change amount of a charging efficiency varies according to the fuel property. Therefore, in consideration of this variation, the estimation air quantity QTH calculated in S12 may be corrected in accordance with the change amount of the charging efficiency in the above-described embodiment. More specifically, for example, relationships among the sensing value of the fuel property sensor 37 (i.e., the alcohol concentration), the estimation air quantity QTH and a correction coefficient k may be defined as a map beforehand, and the estimation air quantity QTH may be multiplied by the correction coefficient k calculated from the alcohol concentration and the actual measurement air quantity QAF. The correction coefficient k should be preferably increased as the alcohol concentration increases. Thus, the estimation air quantity QTH is corrected in consideration of the difference in the charging efficiency of the intake air. As a result, the intake air quantity can be calculated more correctly, and the sensing accuracy can be improved.

In the above-described embodiment, the alcohol concentration is measured using the fuel property sensor 37 as the fuel property sensing device. The construction is not limited thereto as long as the fuel property can be sensed. For example, the alcohol concentration may be calculated based on the engine operation state. Cylinder pressure, the engine rotation speed, a concentration of a component of the exhaust gas or the like may be used as the engine operation state, for example.

In the above-described embodiment, the throttle actuator 15 is used as the air quantity adjusting device, and the intake air quantity is adjusted with the throttle actuator 15. Alternatively, a valve drive device that opens and closes the intake valve 21 may be used as an air quantity adjusting device, and the intake air quantity may be adjusted with opening and closing of the intake valve 21. Also in this case, effects similar to the above-described effects can be exerted.

In the above-described embodiment, the mixed fuel of the alcohol and the gasoline is used as the fuel. The abnormality determination value Rdth is variably set based on the fuel property of the mixed fuel. The fuel is not limited to this. Alternatively, for example, a mixed fuel of heavy fuel and light fuel may be used. Also in this case, the fuel property varies, and the relationship between the air quantity and the output torque varies as in the above description. Therefore, an effect of improving the accuracy of the abnormality detection can be obtained by performing the abnormality determination of the throttle actuator 15 using different abnormality determination values between the heavy fuel and the light fuel.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. An air quantity control device of an internal combustion engine that performs air quantity control by controlling and driving an air quantity adjusting means, which is provided in an intake system of the internal combustion engine for adjusting intake air quantity suctioned into a combustion chamber by opening and closing an intake passage, the air quantity control device comprising:
an actual measurement data calculating means for calculating actual intake air quantity suctioned into the combustion chamber or a value correlated with the actual intake air quantity as an actual measurement data based on a measurement value of an air quantity measuring means provided to the intake passage;
an estimation data calculating means for calculating intake air quantity estimated to be suctioned into the combustion chamber or a value correlated with the estimated intake air quantity as an estimation data based on a drive state of the air quantity adjusting means;
an abnormality detecting means for detecting an abnormality in the air quantity adjusting means based on a deviation degree between the actual measurement data calculated by the actual measurement data calculating means and the estimation data calculated by the estimation data calculating means;
a fuel property sensing means for sensing a property of fuel supplied to the internal combustion engine;
a changing means for changing at least one of an abnormality determination value used by the abnormality detecting means in the abnormality determination using the deviation degree, the actual measurement data and the estimation data based on the fuel property sensed with the fuel property sensing means; and
means for detecting an abnormality in the fuel property sensing means, wherein
the changing means sets the abnormality determination value within a predetermined range defined beforehand, and
the changing means sets the abnormality determination value at the minimum value in the predetermined range when the abnormality in the fuel property sensing means is detected.

2. The air quantity control device as in claim 1, wherein the fuel property sensing means senses a ratio of alcohol in the fuel as the fuel property, and
the changing means changes at least one of the abnormality determination value, the actual measurement data and the estimation data in accordance with the sensed ratio of the alcohol.

3. The air quantity control device as in claim 1, wherein the air quantity adjusting means has a throttle valve for opening and closing the intake passage and an opening degree sensor for sensing an opening degree of the throttle valve,
the estimation data calculating means obtains a sensing value of the opening degree sensor as a parameter indicating the drive state of the air quantity adjusting means and calculates the estimation data based on the sensing value of the opening degree sensor, and
the abnormality detecting means detects an abnormality in the opening degree sensor based on the deviation degree between the actual measurement data and the estimation data.

* * * * *